United States Patent [19]

Singh

[11] Patent Number: 5,615,061
[45] Date of Patent: Mar. 25, 1997

[54] METHOD OF PREVENTNG SOFTWARE PIRACY BY UNIQUELY IDENTIFYING THE SPECIFIC MAGNETIC STORAGE DEVICE THE SOFTWARE IS STORED ON

[76] Inventor: Jitendra K. Singh, 6361 Almaden Rd., San Jose, Calif. 95120

[21] Appl. No.: 315,280

[22] Filed: Sep. 29, 1994

[51] Int. Cl.$^6$ .................................................. G11B 15/04
[52] U.S. Cl. ................................................ 360/60; 360/53
[58] Field of Search ......................... 360/60, 53; 380/3–4

[56] References Cited

U.S. PATENT DOCUMENTS

| | | | |
|---|---|---|---|
| 4,577,289 | 3/1986 | Comerford et al. | 360/60 |
| 4,734,796 | 3/1988 | Grynberg et al. | 360/60 |
| 4,785,361 | 11/1988 | Brotby | 360/60 |
| 4,858,036 | 8/1989 | Ginkel | 360/60 |
| 4,866,769 | 9/1989 | Karp | 360/60 |
| 5,327,563 | 7/1994 | Singh | 380/4 X |
| 5,412,718 | 5/1995 | Narasimhalu et al. | 380/4 |
| 5,418,852 | 5/1995 | Itami et al. | 360/60 |
| 5,428,683 | 6/1995 | Indeck | 380/3 X |

*Primary Examiner*—W. C. Kim

[57] ABSTRACT

The present invention provides a new and novel method for generating a identification number unique to a particular magnetic storage device. In a first preferred method, areas of a storage device which are defective are located. Then specific bad bits within the bad area are determined. The locations of the bad areas plus the location of the bad bits are used to create a identification number for the particular storage device. In a second preferred method, the surface of the magnetic storage device is read in the analog domain. The amplitude variations during the read process are used to generate a identification number for the storage device. Once a identification number is determined, it is used for preventing software piracy or other uses where a specific magnetic storage device needs to be identified.

7 Claims, 6 Drawing Sheets

METHOD OF PREVENTNG SOFTWARE PIRACY BY UNIQUELY IDENTIFYING THE SPECIFIC MAGNETIC STORAGE DEVICE THE SOFTWARE IS STORED ON

FIELD OF THE INVENTION

The present invention relates generally to electronic equipment which incorporate magnetic devices to store information and the like. In particular, this invention relates to computer based equipment which use magnetic disk drives and magnetic card devices to store information and which need to identify a specific one of a plurality of magnetic devices to prevent software piracy.

BACKGROUND OF THE INVENTION

As personal computers have become far more powerful and inexpensive in the last fifteen years, their use has proliferated in households and business. Along with this growth in hardware has come a tremendous growth in software packages available to computer users. Many of programs used on personal computers have significant acquisition costs and it is not unusual for a computer user's software investment to exceed the investment in hardware.

The word processing, data base, and other software packages are expensive because of the large number of skilled programmers required to produce the applications. Additionally, there are significant post sale customer support costs the software providers must provide. Most software packages are distributed as machine-readable information recorded on floppy disks. The programs represented by such software packages are run simply by loading the floppy disks onto a suitable magnetic disk for subsequent use.

In the absence of any "copy protection", anyone who has physical possession of the distribution floppy disks can make several copies of that software package and each copy may be used on a separate computer system. Although making back-up copies of software packages is normally desirable, allowing numerous unauthorized "pirate" copies is very undesirable. Unfortunately software piracy is wide spread and deprives the software suppliers legitimate sales and therefore revenue.

Prior art methods have been developed to try to protect software but they have not meet with acceptance by both the software suppliers and the users. Some of the prior art methods required additional hardware which increased the cost of the product and made the use of the product inconvenient for the user. Other methods required a special floppy disk to be in a disk drive for the software to work. Users, however, disliked having to keep track of the floppy disk.

Of course it is not the act of copying a software package that is troublesome to software suppliers. Rather, it is the use of the copies on various additional computer systems without paying for the right to use those copies. If each computer system is provided with a "unique" identification number, an ideal technique for avoiding the proliferation of unauthorized copies of software packages could be achieved simply by preventing that software from being executed, manipulated or copied until the unique identification number is recorded in the software itself. Subsequent execution of the software package would be enabled only if the recorded identification number matches the unique identification number of the computer system in which the software was invoked. Unfortunately not all computer systems are provided with explicit identification numbers.

What is needed in the industry is a method for distributing software to users that allows the users to conveniently install and use the software while, at the same time, protecting the interests of the software suppliers by preventing the use of the software on an unauthorized computer.

SUMMARY OF THE INVENTION

The present invention provides a method for determining a unique identification number for a computer or other data processing system which incorporates a magnetic storage device. Surface defects and other information unique to a particular magnetic storage device is used to generate a identification number which no other magnetic storage devices will match. The unique identification number is used by a protected software program to prevent the software program from being executed unless the magnetic storage device the program is currently stored on is the same magnetic storage device the software program was initially stored on.

In a first preferred embodiment of the invention, the surface of the magnetic storage device is scanned to locate areas (sectors) which are defective. These sectors are further examined to determine which bits in the sectors are defective. The location of the defective sectors, and the location of specific bad bits within the sectors, are used to provide a identification number. This identification number is determined by a software program during the installation process and stored. Then when the program is executed, the program determines the identification number for the magnetic storage device it is currently stored on and compares current identification number to the stored identification number. If the identification numbers match, the program executes otherwise the program is prohibited from executing.

In a second preferred embodiment of the invention, the surface of the magnetic storage device is scanned, in the analog domain, to determine magnetic properties that are unique to the surface of the specific magnetic device. For example, the amplitude of signals on the surface of the magnetic media reflect minor variations inherent in the manufacture of magnetic media. This information is used to provide a identification number. A software program determines the identification number of the magnetic storage device it is currently stored on and if the identification number is appropriate, the software program is allowed to execute.

By utilizing this novel method, software providers can distribute software programs with the assurance that the program will only run on a single computing system—the computing system having the magnetic storage device the software was initially installed on. At the same time, the software user is not burdened with having to have passwords, "key" disks and the like.

BRIEF DESCRIPTION OF THE DRAWINGS

FIG. 3A–3B illustrate a magnetic storage device having a bad sector which a test pattern is written to and read from.

DETAILED DESCRIPTION OF THE INVENTION

Figure 1:
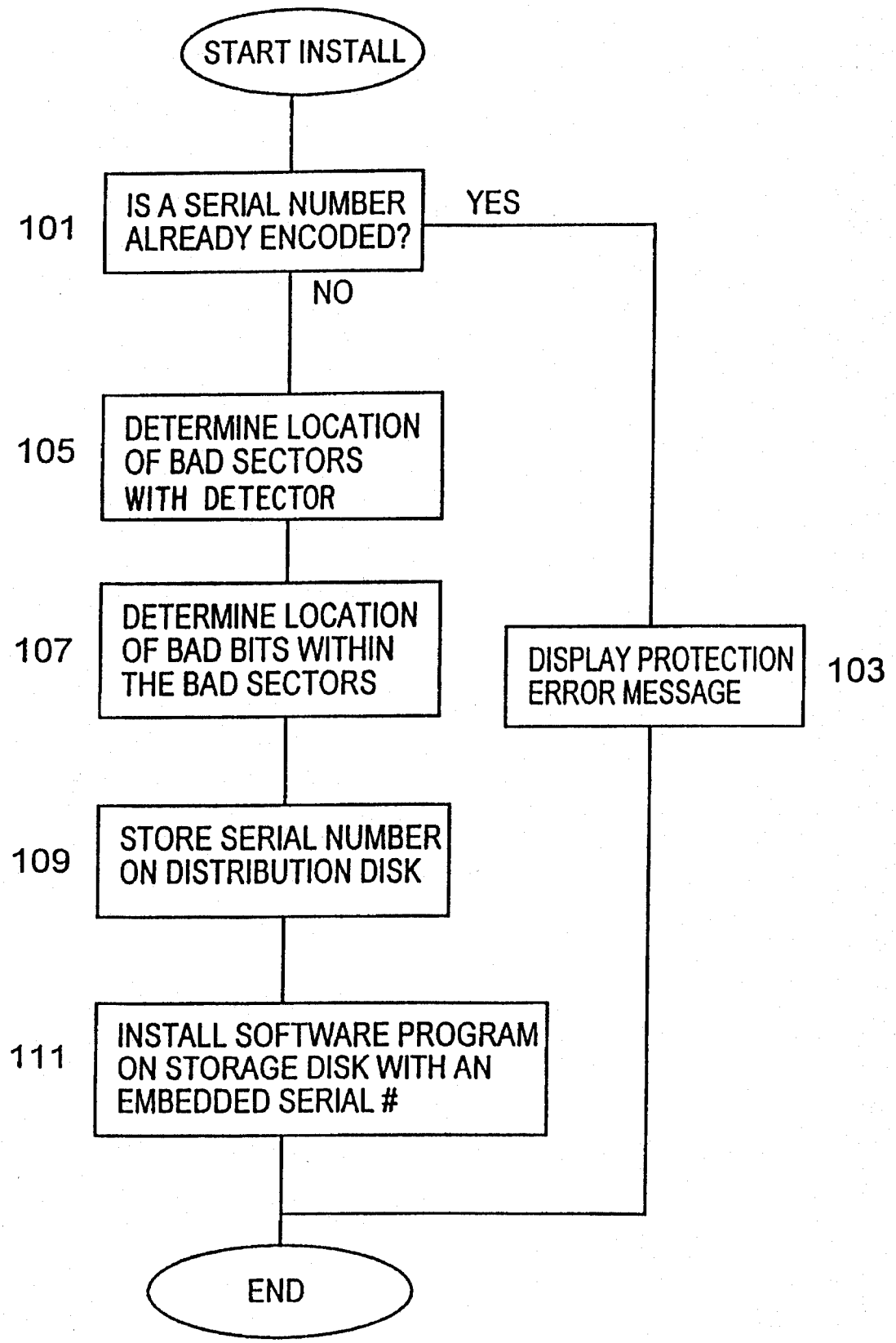
FIG. 1 is a flow chart of the software installation process.

It is contemplated that the present invention will be included in a software package and distributed in the form of a floppy disk or other well known digital distribution means. A software package would include the present invention in the form of a software routine for modifying the software package such that is can only be executed on an authorized computer system. The routine includes a set-up procedure to store in the software the identification number of the computer system which the software package is initially executed on. Thereafter, whenever an attempt to execute the software occurs, the identification number of the current computer system is compared to the stored identification number to enable the software to run if the identification numbers match.

Various methods of protecting software given a unique way to identify a particular computer system have been devised. See, for example, patent application identification number 7/994,797, "File Locking Based On Bad Disk Sectors", submitted by the present inventor and assigned to Hewlett-Packard Company and incorporated herein by reference.

The first embodiment of the invention makes it possible to uniquely identify computers using software alone. This invention uses a fixed but random physical characteristic of a magnetic storage system, bad sectors, to generate a identification number. Computer systems utilizing large disks have several bad sectors located on the disk. This method uses the location of these bad sectors as a basis for generating the identification number. To further insure that the identification number is unique, an attempt is made to write to each of the bad sectors and read back the information written. Since typically the entire bad sector is not bad, the information written and then read back differs at some randomly located bits. This provides additional information characterizing the disk. The two pieces of information, the location of the bad sectors and the specific bad bits within the bad sectors, together provide a unique identification number for the particular magnetic storage device and therefore the associated computer system.

For example, if the magnetic storage device had one bad sector with bits 2 and 5 bad (illustrated in FIG. 4), then the identification number would be the bad sector number plus the two bad bits. This identification number can be implemented as a look-up table or other convenient method.

Because of defects in the magnetic coating material and the application process, a hard disk typically has at least one bad sector and often thirty or more. The higher the capacity of the hard disk, the more platters and therefore the more bad sectors the disk has. Since the defects are random, the resulting bad sector pattern is unique to a particular hard disk.

Some hard disk incorporate a "smart" disk controller and IDE and SCSI hard disks are examples of such disks. The smart controllers hide bad sectors from the computer system such that the disk appears to be error free. In operation the smart controllers simply swap a good sector for a bad sector in a process that is transparent to the host computer system. However, there are commands built into the smart controllers that will cause the controller to report to the host computer system the actual bad sectors on the hard disk. In addition, there are commands that allow the host computer to read and write to the actual bad sectors. These commands are published by the hard disk manufactures and are known to those skilled in the art.

FIG. 1 is a flow chart detailing the steps required to install a software program on a magnetic storage device such as a hard disk. The first step 101 of the process is to check the distribution disk to detect whether the software program has been installed previously. If the program has been previously installed, then the distribution disk will have a identification number (referred to on FIGS. 1 and 2 as a "serial number") or other information added to it. If a identification number or other information is detected, then an error message 103 is displayed and the installation process is terminated. If this is the first installation, then the next step is to determine the location of a bad area such as the bad sectors 105 on the magnetic storage device. Then each bad sector is tested to detect which bits are bad 107. This is accomplished by writing a known bit pattern to each bad sector and then reading what was stored in the sectors. The difference between what was originally written and what was subsequently read provides the information to determine which bits within the sectors are bad.

The bad sector location information and bad bit information is combined to produce a identification number 109. This identification number can be a table consisting of the locations of the bad sectors and bits or some other combination which provides an identification which uniquely identifies the particular magnetic storage device. This identification number is then written on the distribution disk to prevent subsequent installation of the software onto a different magnetic storage device.

Lastly, the installation process loads the software program onto the magnetic storage device and embeds the identification number into the program 111. The identification number can be simply appended to the software program, encrypted or distributed throughout the software to make detection more difficult.

Figure 2:
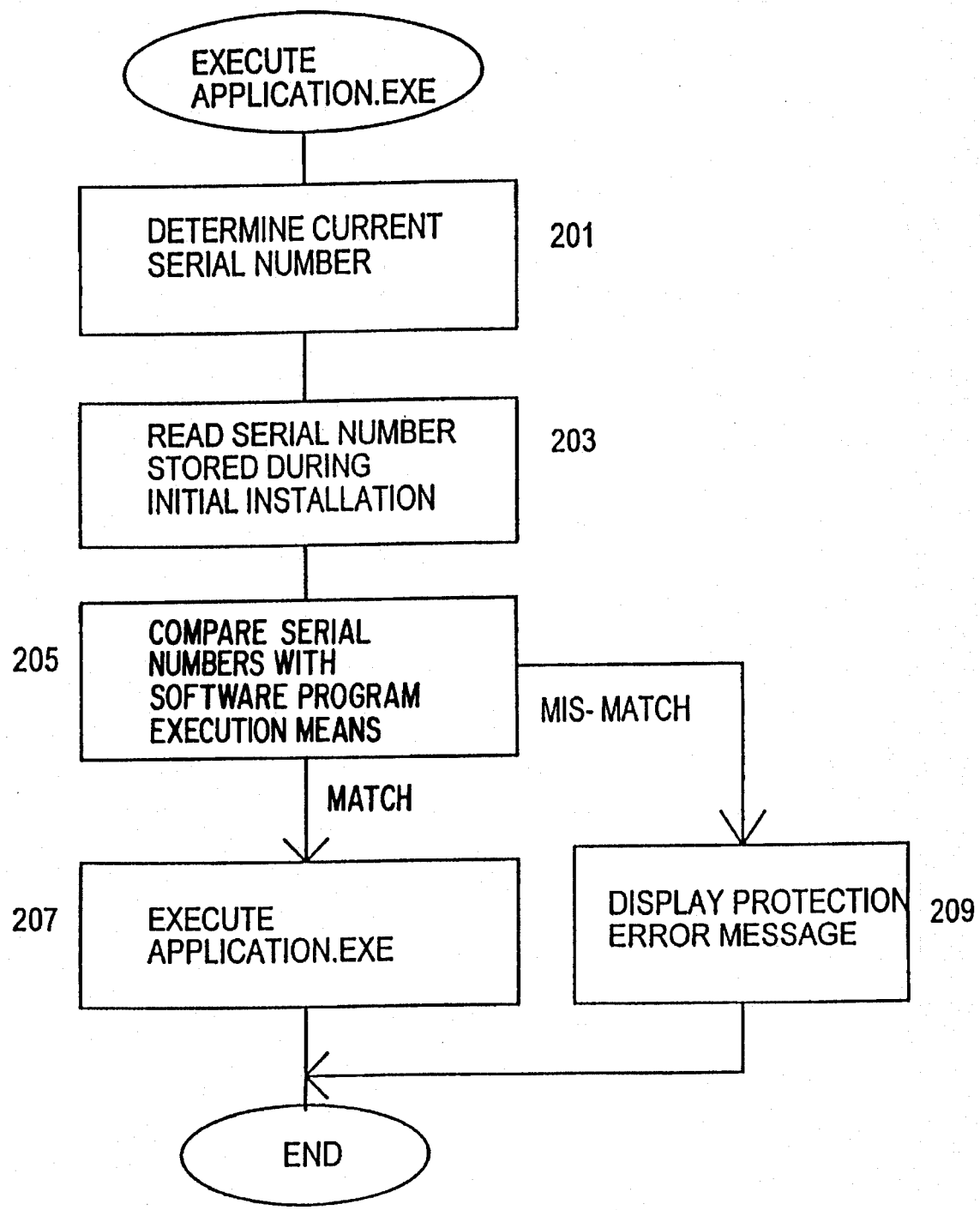
FIG. 2 is a flow chart of the software execution process.

FIG. 2 is a flow chart followed before a protected software package is allowed to execute. The first step 201 is to determine the identification number for the magnetic storage device the software is stored on. This is accomplished in the same way as when the software package is initially installed. That is, information about the location of the bad sectors, and bad bits within the bad sectors, is used to generate a identification number. In the next step 204, the identification number stored during the initial software installation is read. Then the two identification numbers are compared 205. If the identification numbers match, the software program is allowed to execute 207. If the identification numbers do not match, then a protection error message is displayed 209 to inform the user that the software program is protected and will not run.

Figure 3A:
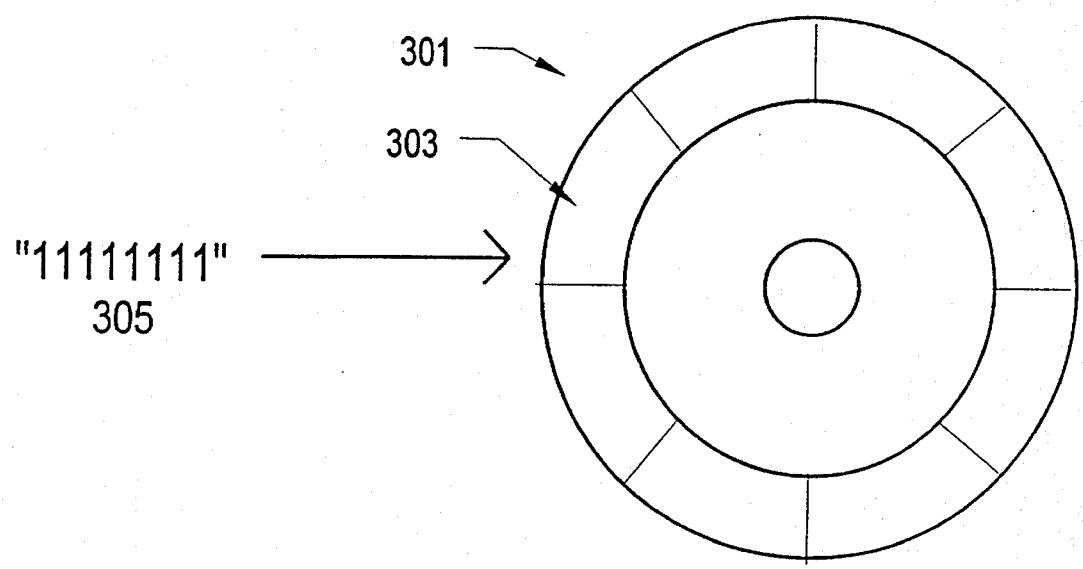
Figure 3B:
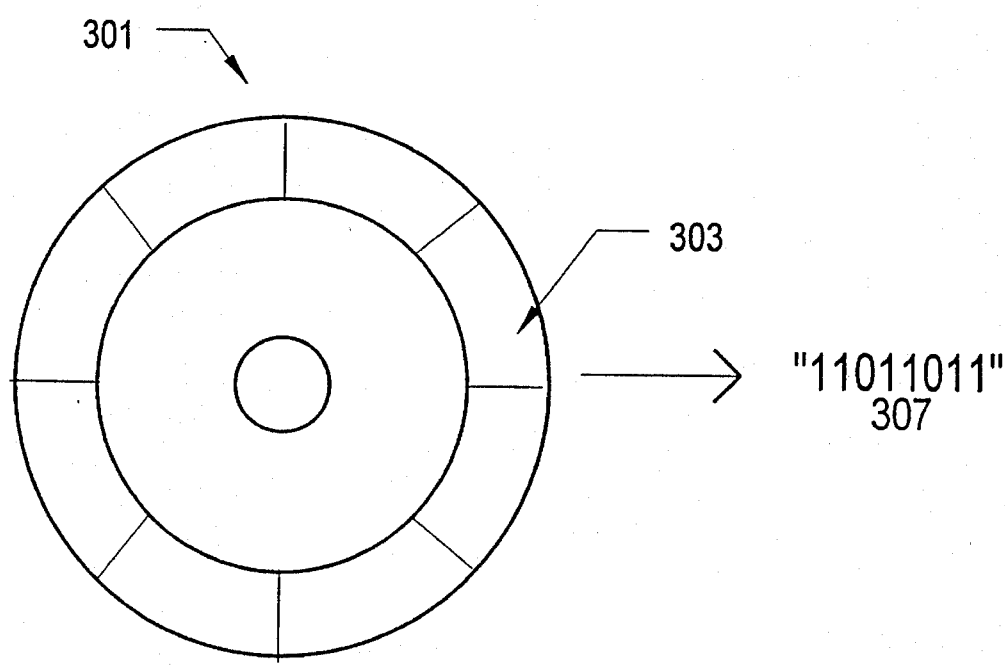

FIGS. 3A and 3B illustrate the process of detecting bad bits within a bad sector. Magnetic disk 301 includes a bad sector 303. A test pattern 305 is stored on the bad sector by the associated computer system (not shown). As illustrated in FIG. 3B, data 307 is read from the bad sector 303.

In this example the test pattern was a 1s pattern 305. If the disk sector 303 had been good, then the data read from the disk sector would have been the same ie. all 1s. The actual data read was "11011011" which indicates that two bits in the sector are bad. Additionally the position of the bad bits is also known. While this example only used eight bits of test data, in practice, the test data would include as many bits as the sector is big. If the sector holds 256 bytes, then the test pattern would be 256 bytes long.

As a first order approximation, a disk drive functions as a tape recorder using a flat circular tape. The disk media is typically constructed as an aluminum disk with a magnetic coating on top. A read/write head moves over the disk while the disk is spinning thereby records and reads data on circular tracks. When data is recorded on the disk, the record head causes magnetic particles in the magnetic coating to align in a uniform way. Then when the read head passes over the disk, the previously aligned magnetic particles induce a voltage in the read head. This voltage is subsequently amplified and used by the disk drive electronics to determine what data was recorded on the disk drive.

The electronics in the disk drive differentiate between a "1" and a "0" by the amount of voltage generated by the read head as it passes over the media. If the voltage exceeds a preset threshold, then the data is interpreted as a "1" otherwise it is interpreted as a "0". The threshold voltage is determined based on many parameters such as the type of magnetic coating used, the type of read/write head and the design of the amplifiers used to construct the disk drive.

If a test pattern of "1s" is recorded in a bad sector of a disk, the result when the sector is read will be as in the prior example. That is, some of the bits will have been interpreted as "0s". This is because when the read head passed over a bit position where the media was defective, not enough voltage was generated in the read head to cross the preset threshold, although the voltage generated by the read head could have been just below the threshold. But since the data is interpreted in a digital way, either over or below the threshold, the actual voltage generated by the head is not known.

Figure 4:
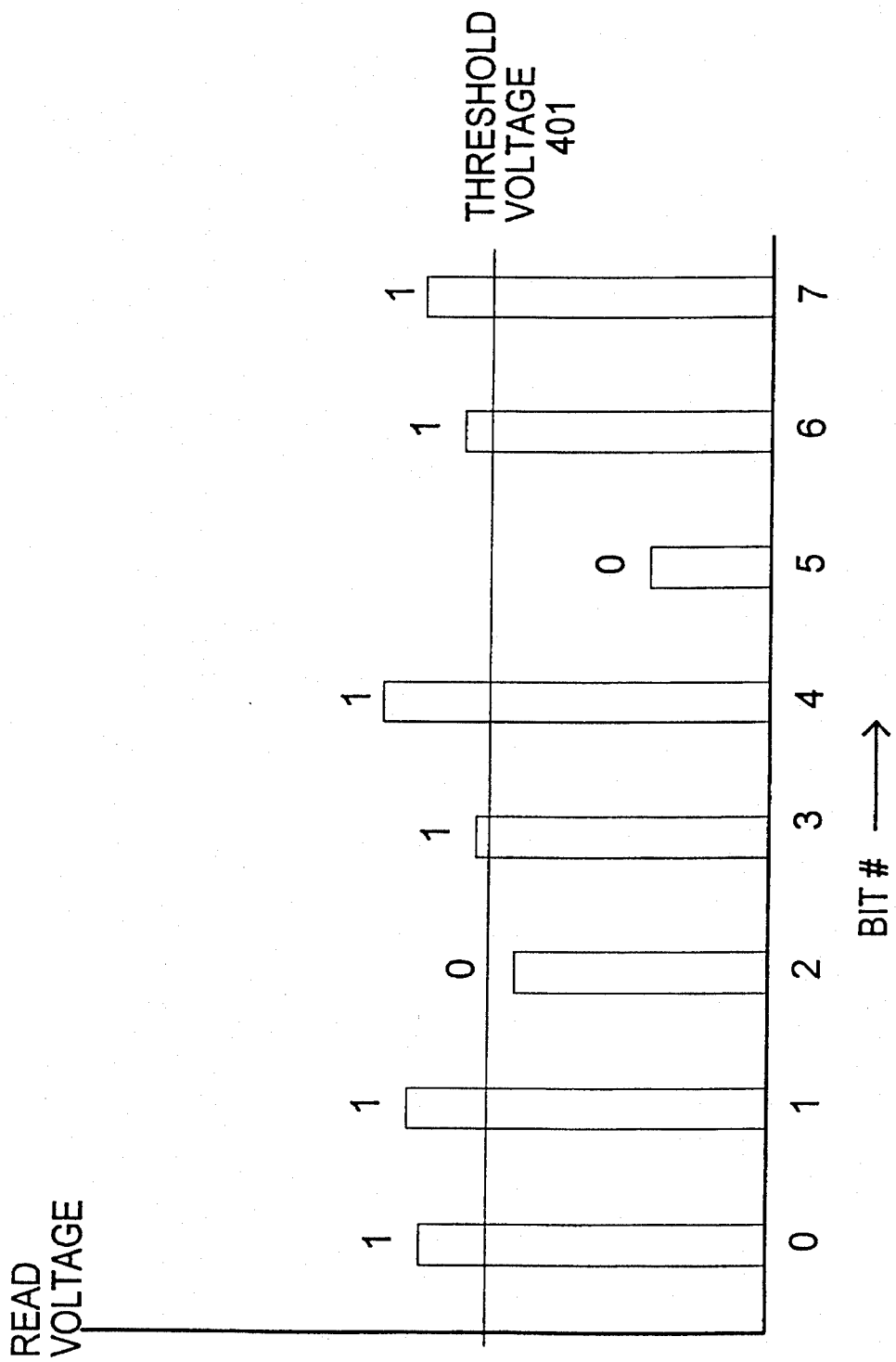
FIG. 4 illustrates the eight bits data read from the bad sector of FIG. 3B.

FIG. 4 illustrates the pattern read from the bad sector in FIG. 3B. As illustrated, the read voltage associated with two of the bits, bits 2 and 5, did not exceed the preset threshold 401. Therefore those two bits were interpreted as "0"s. The actual read voltages generated by the read head are not utilized except with respect to the voltage being over or under the threshold value. So although the voltage associated with bit 2 is close to the threshold, bit 2 is still interpreted as a "0".

The second embodiment of the present invention utilizes an analog means to determine the response received from the magnetic media. In this way the particular voltages generated by a read head passing over the magnetic media is known and used to provide a unique identification number for the associated magnetic device.

Figure 5:
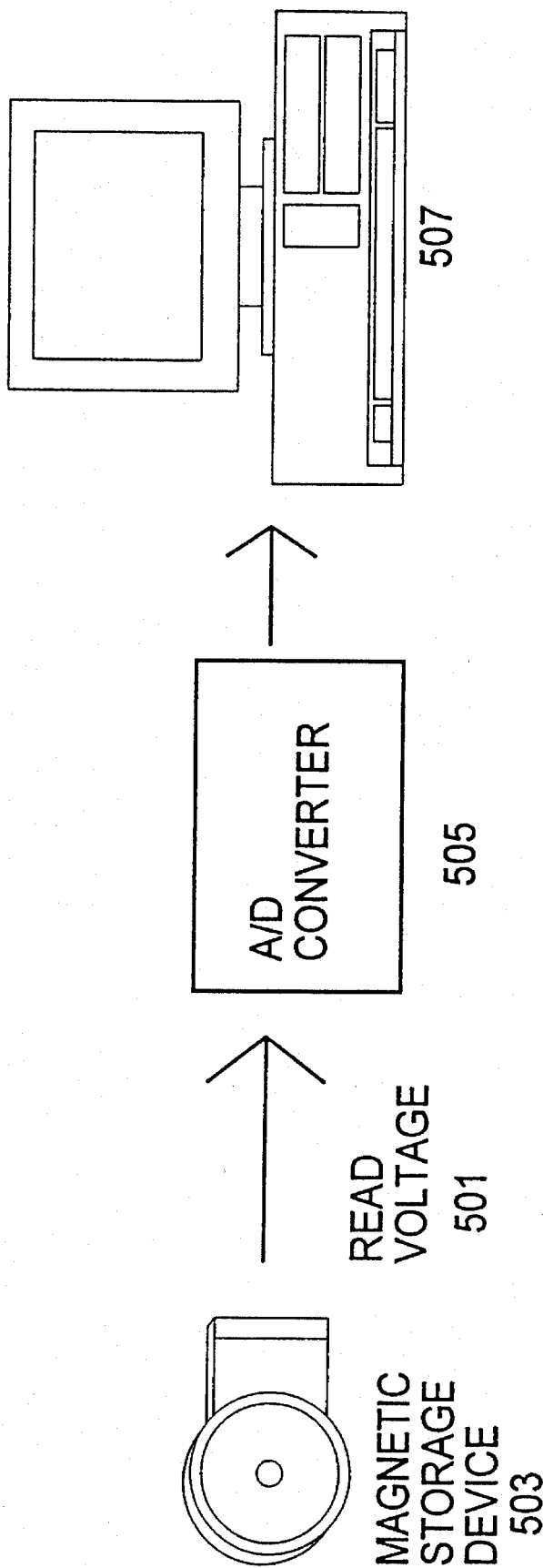
FIG. 5 illustrates an analog method of generating a identification number according to a second preferred embodiment of the present invention.

FIG. 5 illustrates a method of generating a identification number according to the second preferred embodiment of the present invention. As illustrated, the read voltage 501 of a magnetic storage device 503 is fed into an analog-to-digital converter (A/D) 505. The output of the A/D converter is fed into a computer 507.

The A/D converter converts the analog read voltage 501 into a digital value that is read by the computer 507. The computer stores the digital equivalent of the analog value read from the magnetic storage device. Therefore, instead of only knowing whether the read voltage associated with a bit being read was over or under a threshold voltage, the computer stores the actual value of the read voltage associated with the bit. This value is then utilized to generate a identification number for the storage device. The source of the read voltage can be the normal read head for the magnetic storage device or a separate read head added to generate the identification number.

The resolution and accuracy available with this method is dependant on the resolution of the A/D converter utilized and other factors. For example, an 8-bit A/D provides 256 discrete output levels while a 16-bit A/D provides over 64,000 discrete output values. The higher the resolution available, the easier it is to distinguish between similar magnetic devices. The accuracy is dependant on the stability of the electronics used to measure the voltage such that consistent, repeatable, measurements are achievable as is known in the art.

A significant advantage of this method is that any area (even a good sector) of the magnetic storage device is useable to generate a identification number. With a high resolution A/D converter, even minor read voltage variations are detectable and can be used to differentiate between otherwise identical magnetic devices. Since no two magnetic storage devices are exactly alike due to manufacturing tolerances in the magnetic media, read heads and the like, the resultant minor differences in read voltage can be distinguished and used to produce a identification number unique to that storage device.

Figure 6:
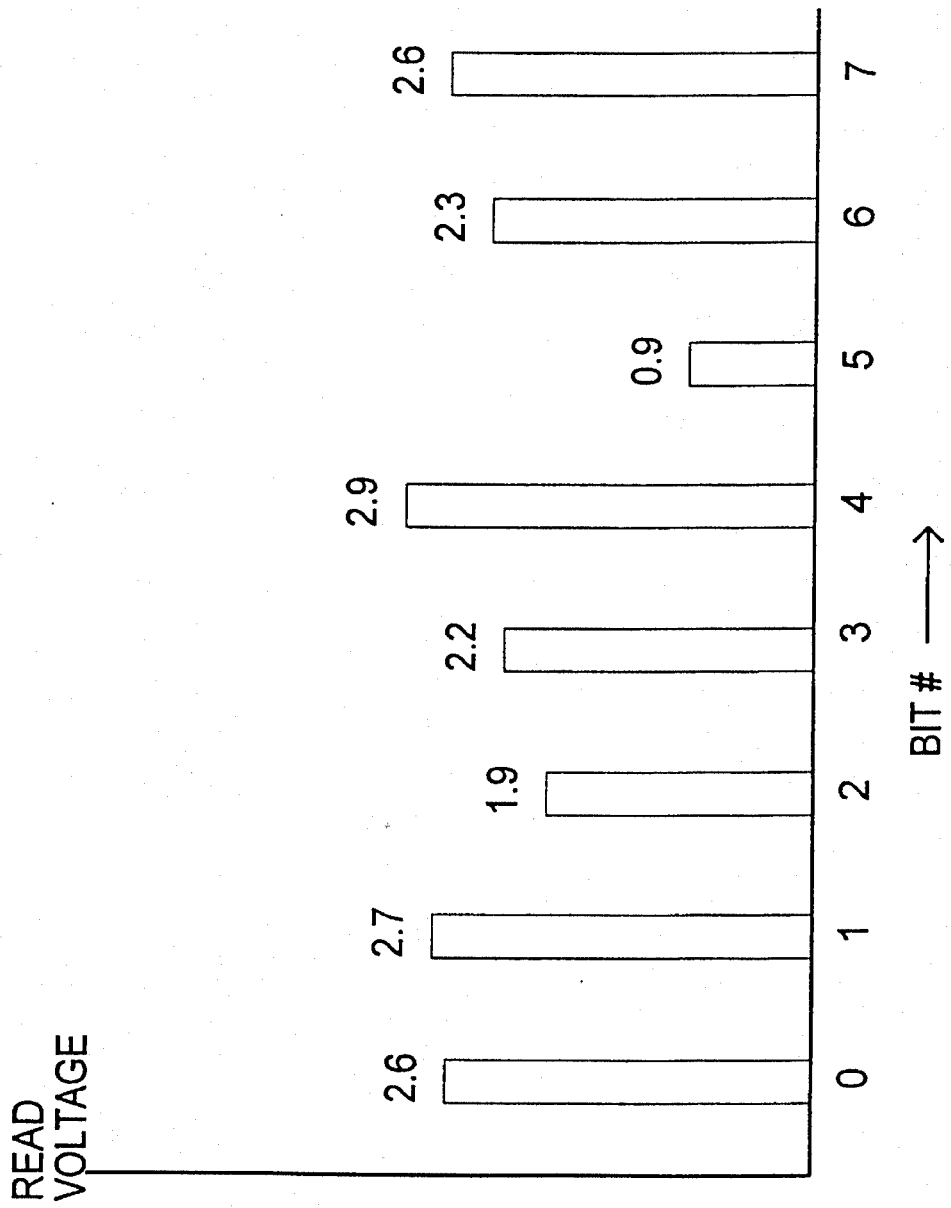
FIG. 6 illustrates the eight bits shown in FIG. 4 interpreted by the analog method of FIG. 5.

FIG. 6 illustrates the same bits shown in FIG. 4 but instead of interpreting the read voltage with reference to a threshold, the actual read voltage associated with each bit is measured. For example, bit 2 generated a read voltage of 1.9 units. So instead of interpreting the bit as a "0" as is done in FIG. 4, the fact that bit 2 generated a read voltage of 1.9 units is used to characterize the bit. In like manner, the read voltage associated with the bits read is used as the signature. The analog method provides a more powerful method for distinguishing between nearly identical magnetic storage devices, such as disks, since it makes more precise measurements as compared to the digital method. While this example only records voltages to one decimal place, in practice the full resolution of the associated A/D would be used and the voltages would be recorded with more precision.

Once a identification number is determined, it is used as described in association with the first preferred embodiment to prevent software piracy. However, while determining a identification number for a magnetic storage device is particularly useful in preventing software piracy, it is also useful for other applications. For example, the identification number can be used as an authorization code to prevent unauthorized use of the associated computer or to prevent use of the storage device with a different computer system.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

I claim:

1. A method for locking software to a specific magnetic storage device, comprising the steps of:

a. detecting a location of a bad area on said specific magnetic storage device at a first point in time;

b. determining a location of a bad bit specific within the bad area on said specific magnetic storage device, wherein the step of determining the location of a bad bit includes the steps of:

causing to be written into the bad area a test pattern having a plurality of bits;

then causing data having a plurality of bits to be read from the bad area;

then comparing the bits of the test pattern to the bits of the data read from the bad area; and determining the location of a bit in said data read from the bad area that does not match an associated bit of the test pattern;

c. then storing the location on said magnetic storage device of the bad area and the location of the bad bit into an identification number storage area associated with a software program; and d. executing the software program; and looking for said bad area and bad bit on a current magnetic storage device, wherein if, when the software program is attempted to be executed, the bad area and bad bit locations stored in the identification number storage area are found on a current magnetic storage device, said current magnetic storage device is identified as said specific magnetic storage device.

2. A method as in claim 1 further comprising the steps of:

a. determining a plurality of bad bits within the bad area;

b. then storing the location of the bad area and the location of the bad bits into the identification number storage area; and c. then executing the software program if, when the software program is attempted to be executed, the bad area and bad bit locations stored in the identification number storage area are found on said current magnetic storage device.

3. An apparatus for locking a software program to a specific magnetic storage device comprising:

a detector for detecting, at a first point in time, the location of a bad area of said specific magnetic storage device and for detecting a location of a bad bit within the bad area, wherein the detector detects a bad bit by writing a test pattern in the bad area, then reads the area where the test pattern was written, compares the test pattern read against the test pattern written, and determines a bit in the read test pattern that does not match an associated bit in the written test pattern; and the detector also stores the location of the bad area and bad bit on said specific magnetic storage device in an identification storage area associated with a software program; and a software program execution means operative to read the location information stored in the identification storage area and to execute the software program if a current magnetic storage device includes a bad area and a bad bit at the same location as that stored in the identification storage area for said specific magnetic storage device.

4. An apparatus as in claim 3 wherein:

the detector detects the locations of a plurality of bad bits within the bad area, wherein said identification storage area consists of said bad bit locations; and the software program execution means executes the software program only if the current magnetic storage device includes bad bits at the same location as that stored in the identification storage area for said specific magnetic storage device.

5. An apparatus for identifying a specific magnetic storage device comprising:

an identification storage area, associated with said specific magnetic storage device, having recorded therein a first plurality of voltages read from a specific surface area of said specific magnetic storage device at a first point in time, said voltages representing data from bad bits and bad areas stored on said magnetic storage device, wherein a detector detects a bad bit by writing a test pattern in the bad area, then reads the area where the test pattern was written, compares the test pattern read against the test pattern written, and determines a bit in the lead test pattern that does not match an associated bit in the written test pattern;

at least a first comparator operative to compare the first plurality of voltages stored in said specific magnetic storage device at a first point in time and to compare the first plurality of voltages stored in said identification storage area with a second plurality of voltages read from a same specific surface area of a current magnetic storage device at a second point in time; and if the first and second plurality of voltages match, then the comparator outputs an identification match signal to an associated computing system.

6. An apparatus as in claim 5 wherein:

the first plurality of voltages are read from the specific magnetic storage device by a magnetic read head and converted into digital format by an analog-to-digital converter.

7. An apparatus as in claim 5 wherein:

a software program is executed by the associated computer system only if the first and second plurality of voltages match after the software program is attempted to be executed.

* * * * *